United States Patent Office
3,266,646
Patented August 16, 1966

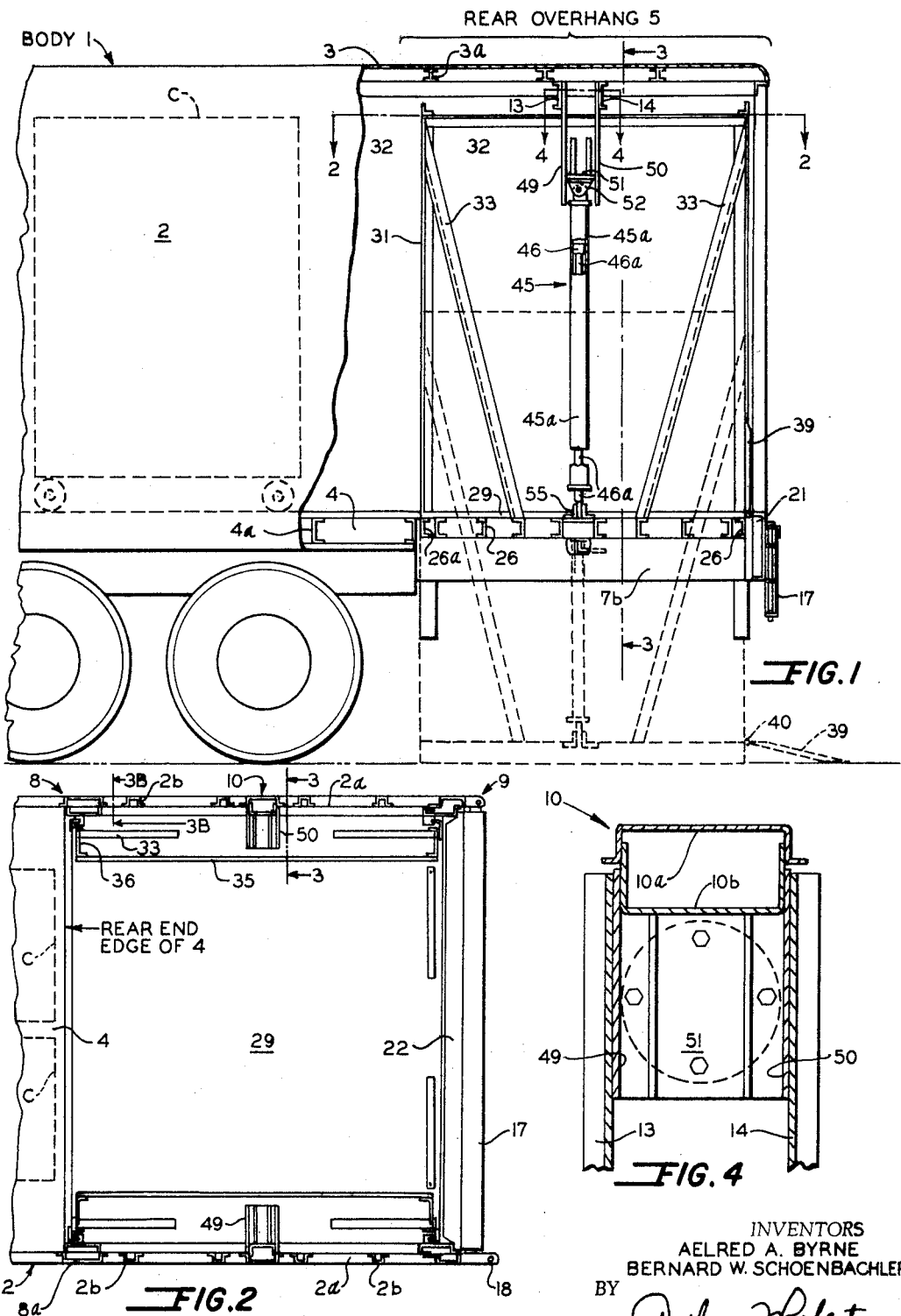

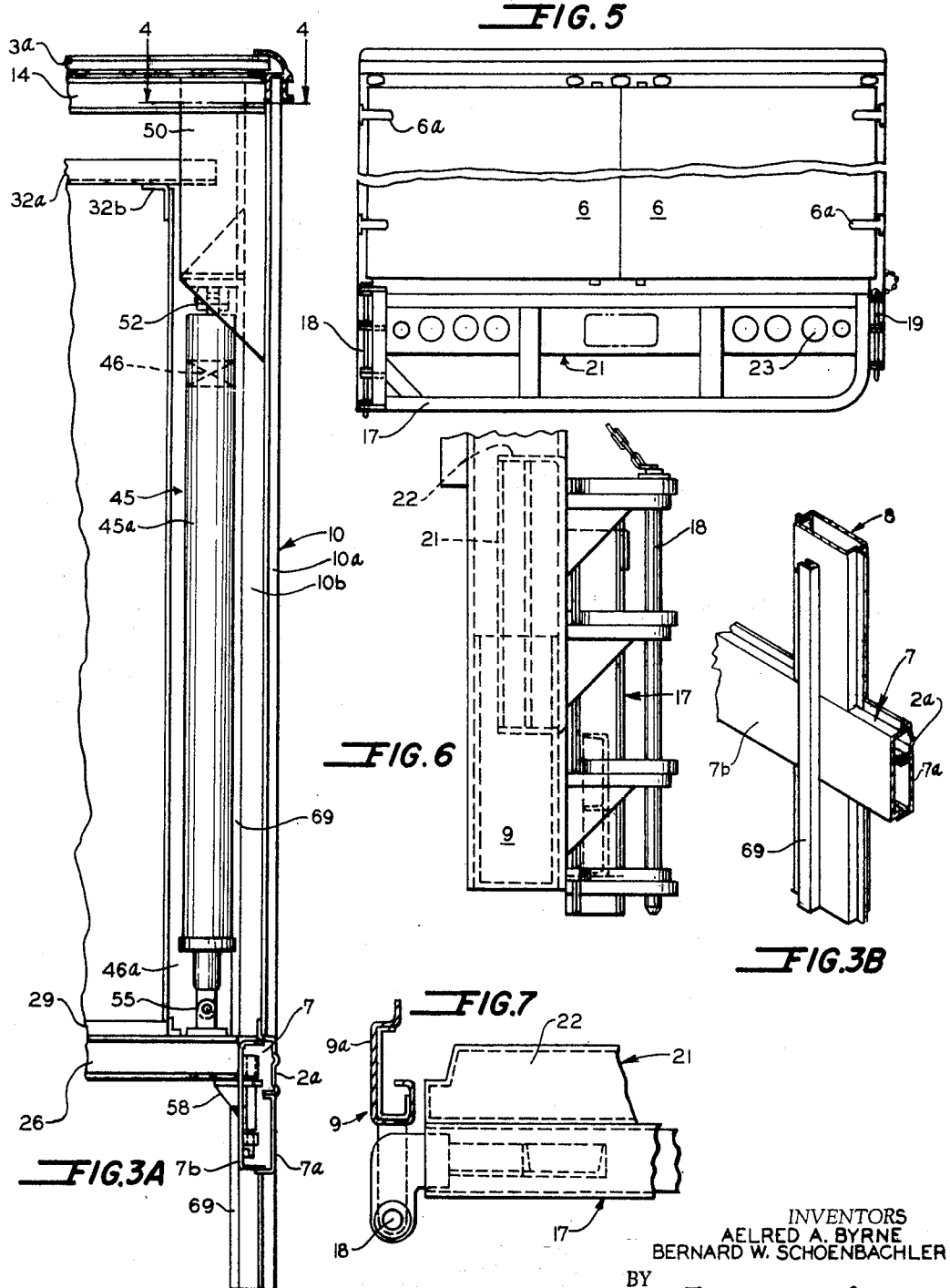

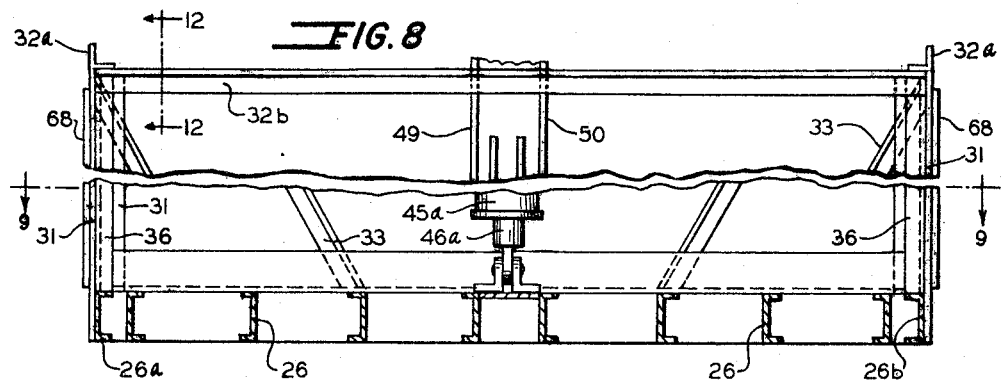
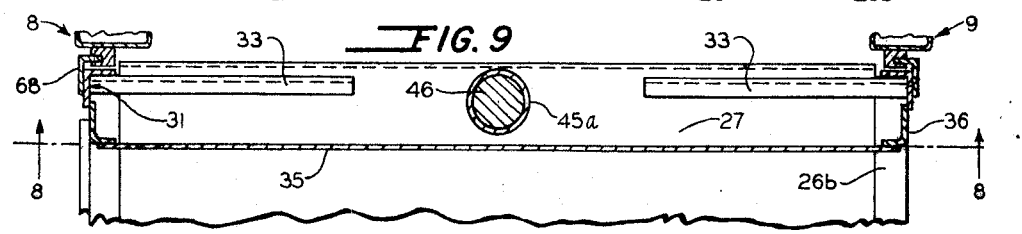
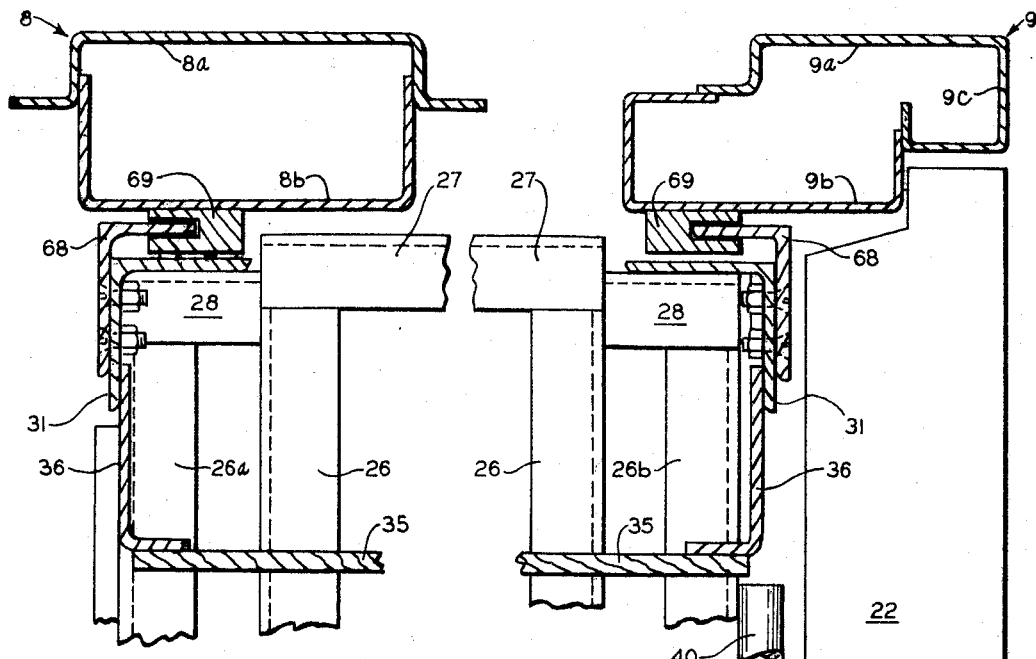
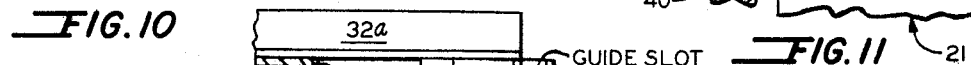
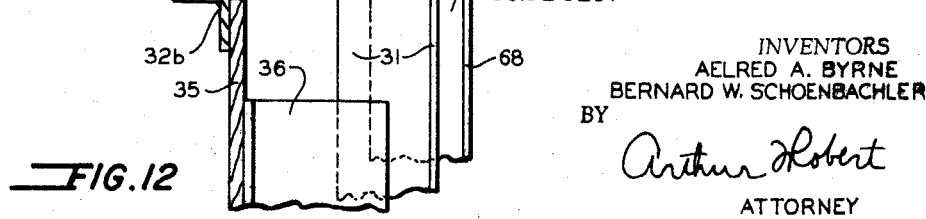

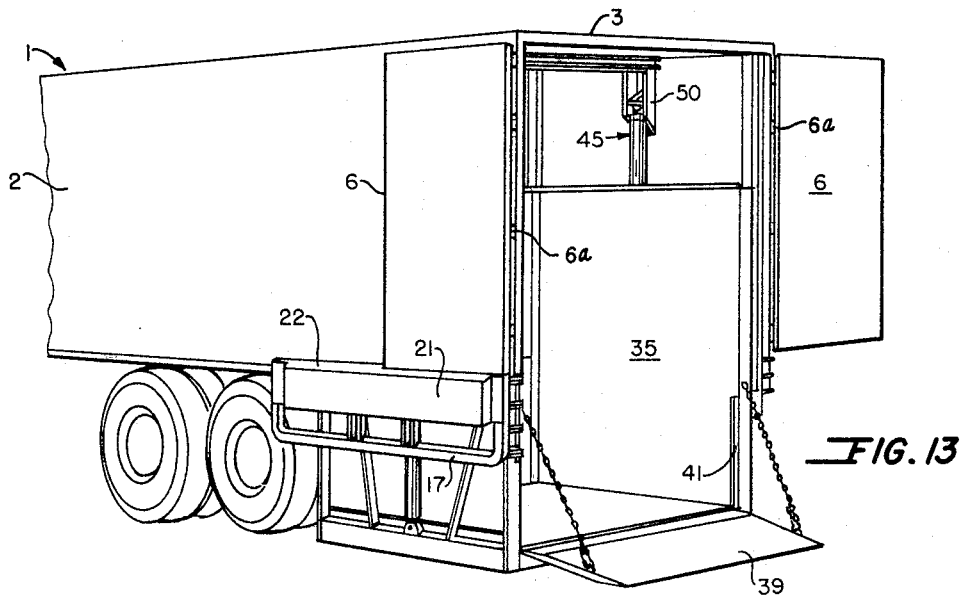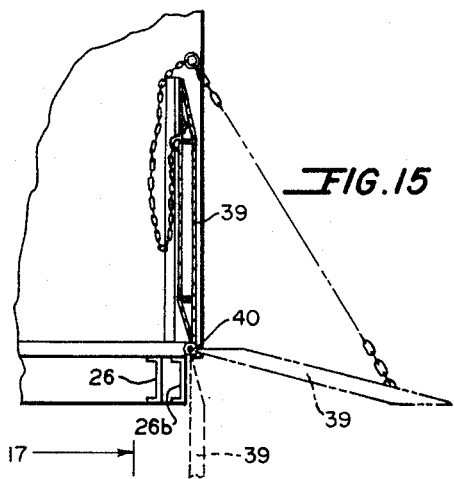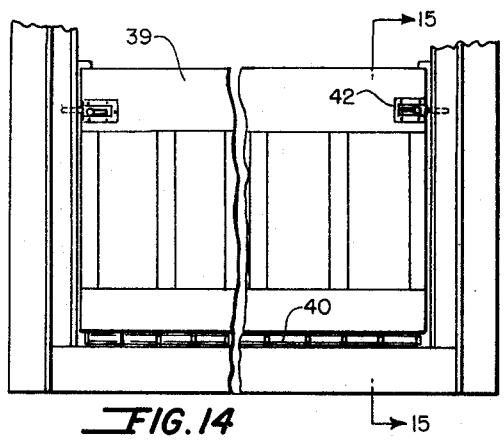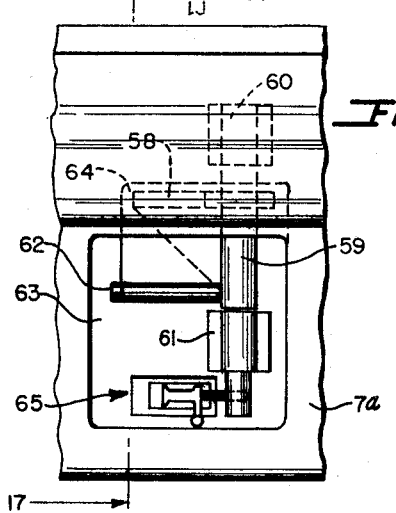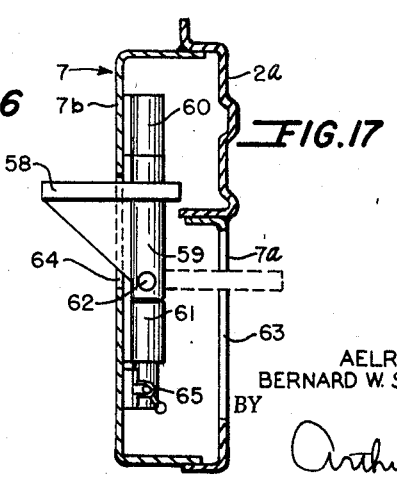

3,266,646
MERCHANDISE TRANSPORTING VEHICLES WITH BUILT-IN REAR END ELEVATORS
Aelred A. Byrne and Bernard W. Schoenbachler, Louisville, Ky., assignors to Hydrolift Incorporated, Louisville, Ky., a corporation of Kentucky
Filed July 20, 1964, Ser. No. 383,718
8 Claims. (Cl. 214—75)

This invention relates to merchandise transporting trucks, trailers and like vehicles with built-in elevators at its rear end. More particularly, the invention relates to vehicles of the type wherein the rear end portion of the truck bed or floor is arranged to function as an elevator platform for vehicle loading and unloading purposes.

As heretofore proposed, vehicles of this type comprise: (A) a rear wheeled truck body having integrated side, top and bottom walls providing a rear body portion which overhangs the rear side of the rear wheels and a front body portion which extends forwardly therefrom, (1) said rear body portion or overhang including an L-shaped opening having a vertical rear door section extending across the rear end of said truck body and a horizontal floor section extending forwardly from the rear end of said truck body at the level of said bottom wall and terminating in the vicinity of the front end of said overhang; (B) an elevator cab having a floor structure; (C) means mounting said elevator in said rear overhang for vertical movement from an upper transportation position, wherein its floor structure closes the floor section of said L-shaped opening, to a lower load-tranferring position; and (D) means for guiding the elevator cab in its vertical movement.

The principal object of the present invention is to improve this type of vehicle to the end of providing it with adequate strength, of increasing the safety and reliability of its operation and of facilitating the speed at which it may be loaded and unloaded.

Other important objects are to improve the truck in one or more of the following respects: to reinforce the side walls of the overhang in a simple and sturdy way which gives the vehicle adequate strength for all purposes without any appreciable loss of transportation space or any undue increase in truck weight; to render the tail gate structure useful as a rear signal mounting means; to provide a simple, sturdy and relatively compact hydraulic means which mounts the elevator for movement between its upper and lower positions and which utilizes an elongate jack so as to insure adequate vertical movement under stable operating conditions; to provide a simple and sturdy arrangement for guiding the elevator throughout its vertical movement without permitting it to cant or bind; and to provide a simple, sturdy and safe means for latching the elevator cab in its transportation position and to mount such means in a conveniently accessible location.

The objects of my invention are largely achieved as follows: (1) by reinforcing each side wall of the rear end portion or overhang of the truck with a structurally strong bottom member projecting rearwardly from the adjacent end of the forward portion of the truck and with a plurality of upright posts integrated to that bottom member at longitudinally-spaced intervals along its length; (2) by providing one of the upright reinforcing posts, preferably a center post, with an elevated support projecting horizontally inward so as to overlie the corresponding side margin of the cab floor, extending an elongate hydraulic jack vertically between the elevated support and the side margin of the cab floor and connecting that jack directly to both; (3) by locating two of the upright posts in each side wall at positions corresponding to the front and rear ends of the elevator cab, providing each corner of the cab with a rigid upright post and interconnecting each corner post of the cab with the adjacent side wall post through guide means preferably of the vertically-elongate tongue-and-groove type and preferably arranged so that the guiding function is performed as far below the cab floor as it is safe to go from a transportation road-clearance standpoint; (4) by reinforcing the overhang along its bottom with a hollow structural member and mounting the cab latch within that member with provisions for rendering that latch accessible from the outer side of that member and by further providing the interior of that member with another equally accessible safety latch for locking the cab latch in its elevator latching position; (5) by providing the rear end of the elevator with a ramp pivotally mounted for movement into a transportation position wherein it extends upwardly along the lower rear end of the cab where it occupies little if any otherwise useful space and where it remains available for immediate use during loading and unloading intervals; and (6) by providing the tailgate structure with a hollow housing, using the top of that housing as a sill for the lower end of the rear door opening and using the interior of the housing as a mounting for the rear signal lights of the truck.

The presently preferred embodiment of my invention is illustrated in the accompanying drawing wherein:

FIGS. 1–4 illustrate a trailer body modified for the purposes of this invention, FIG. 1 being a side elevation of the rear end portion of the trailer with the nearest side wall broken away, FIG. 2 being a horizontal sectional view taken through the rear overhang of the trailer along line 2—2 of FIG. 1, FIG. 3A being a vertical sectional view taken through the far side wall of the rear overhang along a line corresponding to line 3—3 of FIGS. 1 and 2, FIG. 3B being a perspective of a fragmentary portion of the side wall structure adjacent both a front corner of the elevator cab and the floor of the trailer, this view showing in perspective what one sees in vertical section along line 3B—3B of FIG. 2, and FIG. 4 is a horizontal section along line 4—4 of FIGS. 1 and 3A;

FIGS. 5–7 illustrate the tail gate structure, FIG. 5 being a rear elevational view of the tail gate structure and the rear doors of the trailer, FIG. 6 is a fragmentary side elevational view of one end of the tail gate structure and the adjacent corner construction of the trailer body, and FIG. 7 is a top plan view of the tail gate fragment and associated body structure shown in FIG. 6;

FIGS. 8–15 illustrate the elevator, its guides and ramp, FIG. 8 being a vertical section through the elevator cab corresponding to one taken along line 8—8 of FIG. 9 but omitting the wall panel 35, FIG. 9 is a horizontal sectional view of the elevator cab structure along one side wall, this view corresponding to one taken along line 9—9 of FIG. 8, FIG. 10 is an enlarged horizontal sectional view of a front corner post of the elevator cab and a plan view of the adjacent floor structure of the cab and also showing the relationship of that portion of the cab structure to the adjacent portion of the trailer side wall structure, FIG. 11 is an enlarged horizontal sectional view of a rear corner post and a plan view of the associated floor structure of the cab and also showing the relationship of that portion of the cab structure to the adjacent portion of the trailer side wall structure, FIG. 12 is a fragmentary view of the elevator cab structure adjacent an upper front corner thereof, this view corresponding to one taken along line 12—12 of FIG. 8, FIG. 13 is a perspective view of the rear end of the trailer with the rear doors open and the elevator cab and its ramp in the ground engaging position, FIG. 14 is a rear plan view of the ramp in its raised transportation position, and FIG. 15 is a vertical section through the ramp corresponding to a view taken along line 15—15 of FIG. 14; and FIGS. 16–17 illustrate the cab latching mechanism, FIG. 16 being a side elevational view thereof and FIG. 17 being a vertical sectional view corresponding to one taken along line 17—17 of FIG. 16.

The trucking vehicle illustrated in the drawing generally comprises a trailer of the type normally hitched detachably to a tractor or truck through a king pin on the trailer and a fifth wheel on the truck. More particularly, it comprises the following elements: (A) a rear-wheeled trailer body; (B) a tail gate structure; (C) an elevator cab; (D) elevator cab mounting and latching means; and (E) elevator cab guide means.

REAR-WHEELED TRAILER BODY

*Numbers 1–6*

As seen in FIGS. 1–4, the trailer body 1 has integrated side, top and bottom walls 2, 3 and 4 cooperatively forming a horizontally-elongate trailer chamber extending longitudinally from the front end to the rear end of the trailer body. The rear end portion of the body 1, which overhangs the rear wheels of the trailer, is designated as the overhang 5. The rear end of the bottom wall 4 terminates substantially short of the rear ends of the side and top walls and cooperates therewith to provide said rear overhang 5 with an L-shaped opening having a vertically-extending rear door portion and a forwardly-extending horizontal bottom or floor portion, which accommodates the elevator cab.

The vertically-extending rear door portion of this opening extends vertically along substantially the full height and horizontally across substantially the full width of the rear end of the body. Such portion is normally closed by a pair of vertically arranged horizontally-swinging doors 6. As seen in FIGS. 5 and 13, each door 6 is pivotally hinged at 6a to the adjacent stile (provided by a corner post at the rear end of the adjacent side wall 2) for horizontal movement through an angle approximating 270° from one extreme door-closed position, wherein it extends from its hinge 6a transversely across one-half of the rear end opening of the trailer, to another extreme door-open position, wherein it extends from the hinge forwardly along the outer face of the corresponding side wall 2 (see FIG. 13).

The cab-accommodating floor portion of the L-shaped opening extends horizontally along substantially the full length of the rear overhang 5 and horizontally across substantially the full width of the rear end portion of said body at the floor level provided by the bottom wall 4. The rear overhang 5 itself need not extend forwardly appreciably beyond the forward edge of the rear floor opening; hence, for the sake of clarity, we shall view the overhang as having a longitudinal dimension approximating that of the bottom or rear floor opening.

*Side walls—Numbers 2, 7–10*

Each side wall 2 of the trailer body is conventionally characterized by a horizontally-arranged inwardly-open bottom side channel 2a (FIG. 3A) extending longitudinally along the bottom of the side wall 2 from its front end to its rear end and a succession of vertically-arranged inwardly-open channels 2b (FIG. 2) horizontally spaced along the length of the bottom channel 2a with their lower ends suitably welded thereto or otherwise integrated therewith.

In accordance with our invention, the rear overhang portion of each side wall 2 is reinforced both horizontally and vertically. It is reinforced horizontally along its bottom channel 2a by a pair of opposed longitudinally-extending bottom channels which cooperate with bottom channel 2a to provide a horizontally-elongate bottom-frame housing 7 which is vertically wider and horizontally deeper than the conventional frame structure at the bottom of the side wall. It is reinforced vertically at spaced intervals along its length by supplementing the conventionally-employed vertical channels 2b (which are narrow in the longitudinal (length) direction of the trailer body and shallow in the transverse (width) direction thereof), with vertical channel assemblies arranged to provide wider and deeper front and rear corner posts 8 and 9 and a wider and deeper center post 10 disposed centrally between the corner posts.

As seen in FIGS. 3A and 16–17, the reinforcing horizontal bottom channels, which cooperate with conventional bottom channel 2a to provide the bottom frame housing 7, comprise: an inwardly open outer bottom channel 7a placed longitudinally underneath (and welded or otherwise secured to) the bottom wall of bottom channel 2a to increase the vertical width of the bottom frame structure; and an outwardly-open inner bottom channel 7b located along the inner sides of bottom outer channels 2a and 7a, and dimensioned vertically to bridge the combined vertical widths of both outer channels. It is welded or otherwise secured to the upper side wall of outer channel 2a and to the lower side wall of outer channel 7a.

The bottom outer reinforcing channel 7a has a horizontal depth corresponding to the thickness of the conventional portion of the side wall 2. The bottom inner reinforcing channel 7b has a slightly greater horizontal depth; hence, it not only increases the horizontally transverse dimension of the bottom frame portion of the side wall 2 in the inward direction to a corresponding degree but its top side also underlies a vertical space of corresponding size located adjacent the inner face of the conventional side wall 2 and arranged to receive the vertical reinforcing members.

The front corner post 8, as shown in FIGS. 2 and 10, comprises: an upright inwardly-open longitudinally-wide outer channel 8a located within the thin space of a conventionally dimensioned narrow side wall 2; and an upright outwardly-open longitudinally-wide inner channel 8b located substantially within the wider space, which overlies the top side of the reinforcing bottom inner channel 7b, this vertical inner channel 8b opening into the vertical outer channel 8a. Both channels of the front corner post 8 are suitably integrated into the structure of side wall 2 by welding them to each other, welding their lower ends to the top side of housing 7 and their upper ends to the interconnecting structure used at the intersection of the top and side walls.

The rear corner post 9, as shown in FIGS. 2 and 11, similarly comprises vertically-arranged outer and inner channels 9a and 9b. The mouth of the outer channel 9a has its rear lip 9c, which extends transversely inward and forms the rear face of the rear corner post, flanged forwardly and then transversely outward to extend along the rear lip of the mouth of the inner channel 9b while the front lip of the inner channel 9b is flanged rearwardly to extend along the forwardly-directed flange of the front lip of the outer channel 9a. It will be understood that the inner and outer channels are welded to each other where they come together and that they are otherwise integrated in the structure of the side wall 2.

The center post 10, as shown in FIG. 4, is composed of outer and inner vertical channels 10a and 10b which are constructed, arranged, secured and integrated in a manner identical to that of the front corner posts channels 8a and 8b.

*Top walls—Numbers 3, 13–14*

Each top wall 3 is conventionally characterized by a horizontal succession of transverse I-beams 3a extending from the top of one side wall 2 to the top of the other and integrated with both. It is reinforced at the center of the overhang 5 by a forwardly-open cross channel 13 on the front side of the center post 10 and a rearwardly open cross channel 14 on the rear side of the center post 10.

Bottom wall—Number 4

For the most part, the bottom wall 4, which extends between the front end of the trailer and the front edge of the rear floor opening, is conventionally constructed. It includes a longitudinal succession of cross channels 4a spaced at intervals along the length of the trailer with their opposite ends suitably integrated with opposite side walls 2 as by welding each end of each cross channel 4a into the corresponding bottom channel 2a of the corresponding side wall structure. All cross channels 4a, except one or two located immediately adjacent the front edge of the rear floor opening, are conventionally welded to the outer channels 2a of the side wall structure. The excepted one or two of the cross channels 4a, which are near the rear edge of the floor 4 (or near the front edge of the opening in the rear floor), are separated from channel 2a by the forwardly extending portion of the inner reinforcing bottom channel 7b; hence, they are welded to 7b.

The bottom wall 4 preferably is completely omitted between the front edge of the elevator cab-accommodating opening and the rear end of the trailer, except to the extent that the rear sill, provided across the rear door opening by the tail gate structure, may be said to form a part of the bottom wall of the trailer.

TAIL GATE STRUCTURE

In accordance with another feature of our invention, the rear door sill is provided by a tail gate structure which, as shown in FIGS. 1–2, 5–7, 11 and 13, is pivotally hinged to the lower end portion of one rear corner post 9 for horizontal movement through an angle approximating 270° from one extreme or closed position, wherein it extends from the hinge transversely across the rear end of the trailer, to another extreme or open position, wherein it extends from the hinge forwardly along the outer face of the corresponding side wall 2. This tail gate structure comprises: a transversely extending rear bumper bar hingedly mounted on one rear corner post; and a transversely extending hollow sill mounted on the front or protected side of the bumper bar.

Rear bumper bar—Numbers 17–19

The bumper bar, as best seen in FIGS. 5–7, 11 and 13, is in the form of a heavy sturdily-constructed open skeleton frame 17 composed of a pair of vertically-spaced horizontally-arranged frame members which are rigidly connected to each other (at their opposite ends) by vertical frame members and (between ends) by a pair of horizontally-spaced vertically-arranged frame members. The vertical frame member, at one end of the bumper bar 17, is hinged at 18 through a vertical succession of four vertically-spaced L-shaped bumper bar lugs and a hinge pin to a corresponding succession of four lugs rigidly mounted on the adjacent rear corner post and projecting rearwardly therefrom (see FIGS. 5–6). The L-shaped lugs enable the tail gate to be swung 270° from its transverse position to its forwardly extending position. The vertical frame member, at the opposite end of the bumper bar 17, is removably pinned at 19 to the lower end portion of the other rear corner post through suitable bumper bar lugs, a pin and corner post lugs.

Rear door sill—Parts 21–23

The rear door sill comprises a transversely-elongate flat-topped hollow metal casing 21 welded or otherwise suitably secured to the front face of the bumper bar 17 with its upper end projecting above the upper edge of the rear bumper bar to the floor level or to whatever other extent is necessary to place its flat top surface 22 in position to function as the door sill. The interior of this casing may be and preferably is used as a means of housing the rear signal lights; hence, as seen in FIG. 5, the rear face of the hollow sill 21 is provided with suitable openings 23 for stop light, turn light and back-up light purposes.

ELEVATOR CAB AND RAMP

The elevator cab which is best seen in FIGS. 1–3, 8–11 and 13, comprises: a floor structure or platform; a plurality of upright posts rigidly integrated with the platform; cab walls; and a ramp hinged to the platform.

Floor structure or platform—Numbers 26–29

The platform of the elevator cab is dimensioned to fit the floor portion of the L-shaped opening. It comprises: a longitudinal or front-to-rear succession of spaced cross channels 26, which are shown in FIGS. 1 and 8, the front channel 26a and rear channel 26b of this succession being slightly shorter than the other cross channels 26 so that their ends are inwardly offset (see FIGS. 10–11) in relation to the ends of the other channels; a pair of longitudinally-extending inwardly-open channels 27, one at each side, these side channels 27 being welded to the ends of all of the longer cross channels 26; a short inwardly-open side channel 28 (see FIGS. 10–11) at each corner, the inner end of that short or stub side channel 28 abutting (and being welded to) the adjacent end portions of long cross channel 26 and side channel 27 and its inner open side abutting (and being welded to) the adjacent end of the short (front or rear) cross channel 26a or 26b as the case may be; and a steel flooring 29 covering all of the long cross channels 26 and at least part of the remaining channels.

Upright posts—Numbers 31–33

As is best seen in FIGS. 1–2, and 10–11, the cab has four upright posts 31, one at each corner, each post being in the form of an angle iron 31 arranged with its apex pointing obliquely outward, with one leg extending parallel to the sides of the cab and being welded to the outer bight face of the short side channel 28 and with its other leg extending transversely inward across the adjacent (front or rear end) of the short side channel 28 as the case may be.

As seen in FIGS. 1, 8 and 12, the upright elevator posts 31 are reinforced at their upper ends by a rectangular succession of 4 integrally welded angle irons. These 4 angle irons include 2 cross angle irons 32a, one at the front interconnecting the upper ends of the front posts 31 and another at the rear interconnecting the upper ends of the rear posts 31. These front and rear cross angle irons 32a are interconnected with each other by the other 2 angle irons 32b, which are offset inwardly from the ends of the cross angles 32a sufficiently to clear the hydraulic equipment used to raise and lower the elevator.

The upright posts 31 are additionally reinforced by 2 declining angle irons 33 on each side of the cab, one interconnecting the upper end of each post 31 with the floor structure. Each angle iron 33 for a given post, slopes from the upper end of its post 31 downwardly to the outer end of a cross channel 26 which is located between and spaced from the given post 31 and the transverse center plane of the cab. It is welded to both.

Cab walls—Numbers 35–36

The cab has a pair of inwardly-offset walls, one at each side. Each side wall, like the top angles 32b of the cab, is inwardly offset to clear the hydraulic equipment. Each side wall structure of the cab comprises: a wall panel 35, spaced or offset laterally inward from the adjacent front and rear corner posts 31; and an elongate upright angle member 36 bridging the space between and interconnecting each corner post 31 and the adjacent end of the adjacent panel 35.

The front and rear bridging angles 36 on each side rigidly support the corresponding wall panel 35 from the corresponding upright posts; hence, each bridging angle is welded to that leg of the upright post 31, which extends transversely inward. The wall panel 35 is riveted or otherwise suitably secured to its bridging member 36.

Ramp—Numbers 39–42

A ramp 39 extends transversely from the rear end of one cab wall to the other. A hinge 40 pivotally secures it along one horizontal edge to the rear edge of the cab flooring 29 for movement from a vertical transportation position (through an angle of 100 to 120°) to a rearwardly declined ground-engaging load-transferring position or (through an angle of about 180°) to a vertically depending dock-clearing position (see FIGS. 13–15). In its transportation position, the ramp provides a stop across the lower rear end portion of the cab. The ends of the ramp preferably nest into conforming recesses 41 formed in the rear end of each side wall of the cab preferably at the rear end of each wall panel 35. The ramp is latched in its transportation positions by a pair of latches 42, one mounted on the rear face of the ramp near each upper corner at a position where it is transversely aligned with a cooperating latching recess in the adjacent side wall structure of the cab. The provision of an elevator cab with its own ramp is a particularly desirable feature of the present invention.

ELEVATOR CAB MOUNTING AND LATCHING MEANS

The elevator cab mounting and latching means comprises: a hydraulic jack; means mounting the jack on the trailer body; means mounting the elevator cab on the hydraulic piston for movement between upper and lower positions; and means for latching the cab in its upper position.

Hydraulic jack—Numbers 45–46

Each hydraulic jack 45 may be in the form of any conventional double-acting jack having a cylinder 45a and a piston 46 and being dimensioned to provide a vertical stroke of desired proportion plus about 1" of overtravel at the top of its stroke and ½ to 1" at the bottom of its stroke.

Jack mounting means—Numbers 49–52

We prefer and therefore provide two hydraulic jacks 45, one for each side of the cab, each being located in the space between each side of the elevator cab and the adjacent side wall. Each jack is located in a transverse vertical plane passing centrally through the cab and is inverted so that its piston projects downwardly. Each jack is mounted to depend from a support cooperatively carried by the adjacent side wall and the reinforced ceiling structure of the trailer.

This support comprises: front and rear gusset plates 49 and 50 secured to the wide center post 10 which reinforces the side wall 2 of the trailer and to the forwardly open and rearwardly open cross channels 13 and 14 which reinforce the top wall on the front and rear sides of the center post 10; a horizontal plate 51 bridging the space between gusset plates 49 and 50 and secured to both and to the adjacent side wall; and a cylinder mounting bracket 52 located on the underside of horizontal plate 51 and secured thereto, the upper end of the hydraulic cylinder 45a being transversely pivoted to the bracket 52.

Cab mounting means—Number 55

The floor of the cab is pivoted to the lower end of each hydraulic jack piston rod 46a through brackets 55, one for each piston, each bracket being located in the transverse vertical center plane of the cab and rigidly secured to the floor structure thereof.

The piston rod 46a mounts the elevator cab for movement from an upper position in which the floor structure of the cab substantially closes the horizontal bottom or floor portion of the L-shaped opening in the rear overhang 5 to a lower position in which the floor structure rests upon the ground.

Cab latching means—Numbers 58–65

The elevator cab preferably is latched in its upper or transportation position (see FIGS. 3A and 16–17). In accordance with the present invention, a latch member 58 is provided at each side of the cab and arranged for horizontal swinging movement from a latching position (FIG. 17), in which it engages the underside of the cab floor structure when that structure is level with the bottom wall 4, to an unlatching position at right angles to its latching position. To this end, the latching member 58 is carried on a vertical shaft 59 which is located within the horizontally elongate bottom frame housing 7 and that shaft is mounted on the outwardly open inner bottom channel 7b through upper and lower brackets 60 and 61 which are welded or otherwise suitably secured to the inner face of channel 7b. The shaft 59 carries a handle 62 by which it may be turned between latching and unlatching positions, the outer channel 7a of housing 7 having an access opening 63 through which the handle 62 can be reached and operated and an inner channel 7b with an access opening 64 through which the latching member 58 may pass as it swings outwardly into latching position or inwardly to its cab releasing or unlatching position. As an additional precaution an auxiliary latch 65 of the barrel type is mounted within housing 7 in position to latch the vertical shaft 59 in its transportation position which corresponds to the latching position of latch member 58.

ELEVATOR CAB GUIDE MEANS

For smooth reliable operation, it is highly desirable to guide the elevator cab during its vertical movement. While this may be variously accomplished, it is accomplished in accordance with the present invention by providing vertical guides of the tongue and groove type between each front and rear corner post 8 and 9, which is incorporated in the side wall structure of the rear overhang 5 and the corresponding front and rear corner post structures of the elevator cab (see FIGS. 10–11).

Tongue and groove—Numbers 68–69

Accordingly, each front corner post 8 of the rear overhang 5 is connected to the adjacent front corner post 31 of the cab by means of a vertically-arranged tongue-providing angle 68 and a vertically-arranged groove-providing bar 69. While the bar may be secured either to the trailer body or to the cab, it is shown as being secured to the bight of the inner channel 8b on the front corner post 8 with its vertically-extending groove opening forwardly. This grooved member 69 is thus mounted on the trailer side wall to project from the floor level upwardly through a distance substantially equal to the full length of the cab post 31. More importantly, it also projects downwardly from the floor level as much as it is possible to project and yet keep a safe transportation clearance between its lower end and ground level. For example, with a distance of approximately 52" between the upper surface of the floor 4 and ground level, we have obtained excellent results with the bar 69 projecting about 25" downwardly from that floor level leaving a clearance of about 27" between its lower end and the ground.

The tongue 68 is provided by one side of an angle iron, the other side of which is secured to the transversely-extending side of the front corner post 31.

The same structure is employed at each rear corner post 9, the tongue providing bar 69, in this case, being secured to the bight of the inner channel 9b of the rear corner post on the trailer body.

OPERATION

We assume: that the trailer cab is latched in its transportation position with the rear doors and tail gate structure closed; that the trailer is loaded with twelve food-handling multi-shelf carts "C" arranged in two long rows running from the front to the rear of the trailer body, each cart being loaded with various items of food which are being transported from a central warehouse for distribution among three retail outlets; that the trailer has arrived at the first outlet, which is scheduled to receive four carts; and that it is in position for unloading purposes.

The operator now opens the door 6 and swings them through an angle of 270° so that they respectively extend along the outer face of opposite side walls 2. When the tail gate structure 17, 21 is unpinned at 19 and swung about hinge pin 18 through an angle of 270° to a similar position as shown in FIG. 13, the latched ramp 39 functions as a stop preventing the accidental unloading of any of the material, which may then be on the elevator. The latches 42 of the ramp 39 are now accessible; hence, they may be unlatched and the ramp lowered to its rearwardly slanted unloading position which is shown in FIGS. 13 and 15. However, if the trailer were to be unloaded on an elevated dock, the ramp 39 may be additionally lowered to the vertically depending dock-clearing position shown in FIG. 15.

The hydraulic pump (not shown) which supplies hydraulic fluid under pressure to the hydraulic jacks 45 should be started. It may be desirable at this time to operate the pump control (not shown) into the elevator raising position so as to relieve the pressure that may be on the elevator cab latch 58. Thereupon the operator unlatches the barrel latch 65 for the cab latch and then engages handle 62 of the cab latch to swing that handle 90° from the latching position shown in FIG. 16 to its unlatching position wherein it projects outwardly through opening 63. This effects the removal of latch 58 on one side of the cab from its latching position underneath the floor of the cab. The corresponding latches 65 and 58 on the opposite side of the trailer overhang are unlatched.

With two of the loaded food carts "C" on the elevator cab, the hydraulic controls may be operated to actuate both hydraulic jacks in the direction required to lower the cab into its ground-engaging unloading position. When the elevator reaches its unloading position and ramp 39 is down, both carts "C" are simply rolled from the cab down the ramp and delivered to the retail outlet personnel. Since 4 carts are intended for this particular outlet, the elevator is raised to its transportation position, the next 2 carts "C" are now moved onto the elevator, the cab lowered and the carts removed from the cab and delivered to the outlet.

The ramp 39 may now be raised and latched, the elevator raised and latched, the doors 6 closed and the tail gate structure swung to and pinned in its operative transportation position across the rear end of the trailer. The trailer then proceeds to the second retail outlet and repeats the unloading procedure to deliver such loaded carts as are consigned to that outlet. Thereafter the trailer proceeds to the third retail outlet and delivers the remaining carts.

The trailer should, of course, return all empty carts to the warehouse and while these carts may be loaded at the end of each unloading operation, it may be a better practice to defer loading empty carts until the trailer is fully unloaded. Thereafter it a simple matter to load the empty carts of the last outlet and return to the warehouse via each of the other retail outlets for empty cart loading purposes.

MISCELLANEOUS

The foregoing arrangement has many advantages. It is sturdily yet simply constructed. The horizontal housing 7, which extends longitudinally along the bottom side wall of the overhang 5, and the vertical front and rear corner posts, which extend upwardly from the top side of the housing 7, not only provide the overhang with adequate strength but also facilitate the provision of guide means at each of the four corners of the cab. The space between each inwardly offset side wall of the cab and the adjacent side wall center post of the trailer is adequate to receive the hydraulic jacks. The center posts provide the reinforcing strength required by such jacks while the interior of the housing 7 provides a convenient and accessible location for the hydraulic controls required by the jacks. Inside of the trailer, duplicate hydraulic controls may be provided along the front side of at least one of the front corner posts.

While the elevator is mounted for movement simply by connecting the projecting ends of piston rods to the bottom of the cab, the provision of guides at the four corners of the cab and the extension of those guides downwardly below the floor of the trailer insures a smooth trouble-free movement of the elevator between its upper and lower positions, there being no tendency to cant or bind.

The attachment of the ramp to the elevator cab facilitates the loading and unloading operations while the recessed storage position provided for that ramp facilitates the transportation of the ramp without interfering with the raising and lowering of the cab and the storage of the carts.

Having described our invention, we claim:

1. A merchandise transporting vehicle of the type having a built-in elevator at and accessible through its rear end, comprising:
   (A) a rear wheeled truck body having integrated side, top and bottom walls providing a rear body portion which overhangs the rear side of the rear wheels and a front body portion which extends forwardly therefrom,
       (1) said rear body portion or overhang including an L-shaped opening having a vertical rear door section extending across the rear end of said truck body and a horizontal floor section extending forwardly from the rear end of said truck body at the level of said bottom wall and terminating in the vicinity of the front end of said overhang;
   (B) an elevator cab having a floor structure;
   (C) means mounting said elevator in said rear overhang for vertical movement from an upper transportation position, wherein its floor structure closes the floor section of said L-shaped opening, to a lower load-transferring position;
   (D) means for guiding the elevator cab in its vertical movement; and
   (E) horizontally-elongate tailgate structure hingedly mounted on the rear end of the truck body for horizontal pivotal movement forwardly into and rearwardly out of a transportation position wherein it extends transversely across the width of the truck,
       (1) said tailgate structure including
           (a) a rear bumper bar in the form of a transversely extending structural frame presenting front-to-rear openings in said transportation position,
           (b) a transversely elongate hollow metal casing mounted on the bumper bar to extend on the front protected side thereof, and
           (c) signal means mounted to extend within said casing in position to signal rearwardly from said casing through said bumper bar openings.

2. The vehicle of claim 1 wherein:
   (A) said tailgate structure provides a sill at the lower end of the rear door section of said L-shaped opening.

3. A merchandise transporting vehicle of the type having a built-in elevator at and accessible through its rear end, comprising:
   (A) a rear wheeled truck body having integrated side, top and bottom walls providing a rear body portion which overhangs the rear side of the rear wheels and a front body portion which extends forwardly therefrom,
       (1) said rear body portion or overhang including (a) an L-shaped opening having a vertical rear door section extending across the rear end of said truck body and a horizontal floor section extending forwardly from the rear end of said truck body at the level of said bottom wall and terminating in the vicinity of the front end of said overhang, (b) one horizontally elongate bottom frame member rigidly integrated into one side wall of the overhang to form the bottom portion of said one side wall substantially throughout the length of the overhang, and (c) a plurality of upright posts integrated into said one side wall of said overhang at spaced intervals along the length thereof to extend upwardly from the top of said one elongate bottom frame member, said posts including front and rear side wall posts respectively adjacent the front and rear end portions of the horizontal floor section of said L-shaped opening;

(B) an elevator cab having
 (1) a floor structure, and
 (2) a pair of upright posts rigidly mounted on the floor structure at spaced intervals along that one side of the cab which is adjacent to said one side wall of the overhang,
  (a) said upright cab posts respectively corresponding to said front and rear sidewall posts;

(C) means mounting said elevator on said truck body and in said rear overhang for vertical movement
 (1) from an upper transportation position, wherein its floor structure closes the floor section of said L-shaped opening,
 (2) to a lower load-transferring position; and (D) means for guiding the elevator cab in its vertical movement, including a pair of slidably interengaging guide members comprising
 (1) one vertically elongate stationary guide member rigidly mounted on said one sidewall of said overhang to extend
  (a) from one elevation, located substantially above the horizontal floor section of said L-shaped opening,
  (b) downwardly along one of said sidewall posts
  (c) to another elevation located substantially below the horizontal floor section of said L-shaped opening at a predetermined clearance distance above ground level, and
 (2) another vertically-arranged guide member rigidly mounted on one of said cab posts
  (a) for vertical movement therewith and
  (b) in slidable engagement with said wall mounted guide member for guidance thereby.

4. The vehicle of claim 3 wherein:
(A) said rear overhang includes
 (1) two of said horizontally-elongate bottom frame members, one for each side wall of the overhang, and
 (2) four of said upright posts providing one pair of front and rear posts on each side wall;
(B) said elevator cab includes
 (1) four of said upright posts forming one pair of front and rear corner posts on each side of the cab; and
(C) said guide means includes
 (1) four of said elongate stationary guide members, one adjacent each of side wall posts, and
 (2) four cooperating guide members, one mounted on each upright elevator cab post.

5. A merchandise transporting vehicle of the type having a built-in elevator at its rear end, comprising:

(A) A rear wheeled truck body having integrated side, top and bottom walls providing a rear body portion which overhangs the rear side of the rear wheels and a front body portion which extends forwardly therefrom,
 (1) said rear body portion or overhang including
  (a) an L-shaped opening having a vertical rear door section extending across the rear end of said truck body and a horizontal floor section extending forwardly from the rear end of said truck body at the level of said bottom wall and terminating in the vicinity of the front end of said overhang, and
  (b) a pair of upright posts integrated into each side wall of said overhang, one adjacent the front end portion and the other adjacent the rear end portion of the horizontal floor section of said L-shaped opening;

(B) an elevator cab having a rectangular floor structure and four upright posts rigidly mounted on that structure, one at each corner, the front and rear corner posts along each side of the cab respectively corresponding to the front and rear wall mounted posts on the adjacent side wall of the overhang;

(C) means mounting said elevator on said truck body and in said rear overhang for vertical movement
 (1) from an upper transportation position, wherein its floor structure closes the floor section of said L-shaped opening,
 (2) to a lower load-transferring position; and (D) means for guiding the elevator cab in its vertical movement, including a vertically arranged tongue- and groove connection between each cab post and the corresponding wall mounted post.

6. An improvement in the rear end structure of a cargo transporting rear-wheeled truck body of the type having a rear-body portion, which overhangs the rear side of the rear wheels and which includes an L-shaped opening having a vertical rear-door section and a horizontal floor section, and means mounting an elevator cab in the rear overhang for guided vertical movement from an upper transportation position wherein it closes the floor section of the L-shaped opening to a lower load-transferring position, comprising:

(A) a horizontally elongate tail-gate structure hingedly mounted on the rear end of the trailer body for horizontal pivotal movement forwardly into and rearwardly out of a transportation position wherein it extends transversely across the width of the trailer in position to provide a door sill for the rear-door section of said L-shaped opening,
 (1) said tail-gate structure including
  (a) a rear bumper bar in the form of a transversely-extending structural frame presenting at least two front-to-rear signal openings in said transportation position,
  (b) means forming a signal casing on the front protected-side of said bumper bar, and
  (c) signal means mounted within said casing in position to signal rearwardly through each of said bumper bar signal openings.

7. An improvement in the elevator cab structure of a cargo transporting rear-wheeled truck body of the type having a rear-body portion, which overhangs the rear side of the rear wheels and which includes an L-shaped opening having a vertical rear-door section and a horizontal floor section, and means for mounting an elevator cab in the rear overhang for guided vertical movement from an upper transportation position wherein it closes the floor section of the L-shaped opening to a lower load-transferring position, comprising:

(A) an elevator cab having a horizontally-extending floor structure and a vertically-extending structure at a rear corner of the cab;

(B) a ramp mounted on the elevator cab for pivotal movement into and out of a transportation position about a horizontal axis adjacent the rear end of the floor structure of the cab, (1) said ramp, in its transportation position, extending upwardly from said axis to provide a stop across the lower rear end portion of the cab; and (C) means for releasably latching the ramp in its transportation position to said vertically-extending rear-corner structure of said cab.

8. The vehicle of claim 7 wherein:

(A) said elevator cab has a transversely-spaced pair of vertical side walls extending longitudinally forward from its rear end; and (B) in its transportation position, at least one end of the ramp extends vertically along the rear end portion of one side wall of the cab and is latched thereto.

References Cited by the Examiner

UNITED STATES PATENTS

| | | | |
|---|---|---|---|
| 2,530,341 | 11/1950 | Satsky | 214—75 |
| 2,650,724 | 9/1953 | Bill | 214—75 |
| 3,051,335 | 8/1962 | Bartlett | 214—75 |

GERALD M. FORLENZA, *Primary Examiner.*

R. G. SHERIDAN, *Assistant Examiner.*